United States Patent [19]
Drexel et al.

[11] Patent Number: 5,191,793
[45] Date of Patent: Mar. 9, 1993

[54] FLUID MASS FLOW METER DEVICE WITH REDUCED ATTITUDE SENSITIVITY

[75] Inventors: Charles F. Drexel, Rolling Hills Estates; Richard F. Blair, Long Beach, both of Calif.

[73] Assignee: Tylan Corporation, Carson, Calif.

[21] Appl. No.: 912,007

[22] Filed: Jul. 10, 1992

Related U.S. Application Data

[63] Continuation of Ser. No. 283,050, Dec. 6, 1988, abandoned, which is a continuation of Ser. No. 150,463, Feb. 5, 1988, abandoned, which is a continuation of Ser. No. 9,008, Jan. 30, 1987, abandoned, which is a continuation of Ser. No. 834,150, Feb. 26, 1986, abandoned, which is a continuation of Ser. No. 588,586, Mar. 12, 1984, abandoned.

[51] Int. Cl.⁵ ............................................. G01F 1/68
[52] U.S. Cl. ............................. 73/204.22; 73/204.25
[58] Field of Search .......... 73/204.18, 204.19, 204.22, 73/204.25, 204.27

[56] References Cited

U.S. PATENT DOCUMENTS

| | | | |
|---|---|---|---|
| 2,729,976 | 1/1956 | Laub | 73/204 |
| 3,938,384 | 2/1976 | Blair | 73/204 |
| 4,056,975 | 11/1977 | LeMay | |
| 4,517,838 | 5/1985 | Wachi et al. | 73/204 |

FOREIGN PATENT DOCUMENTS

| | | |
|---|---|---|
| 53-67156 | 6/1978 | Japan . |
| 56-73317 | 6/1981 | Japan . |
| 0081421 | 7/1981 | Japan . |
| 0110920 | 7/1982 | Japan . |
| 60-50289 | 11/1985 | Japan . |

OTHER PUBLICATIONS

I. Langmuir, "Convection and Conduction of Heat in Gases", The Physical Review, vol. 34, No. 6, Jun. 1912, pp. 401-422.

Primary Examiner—Herbert Goldstein
Attorney, Agent, or Firm—Robbins, Dalgarn, Berliner & Carson

[57] ABSTRACT

Reduced attitude sensitivity is achieved in a fluid mass flow meter of the type which determines fluid flow from the temperature difference between an upstream sensor and a downstream sensor positioned along the flow path of the fluid externally of a sensing conduit for the fluid. A housing, taking particular forms, has wall structure spaced along the sensors adapted to substantially limit the ambient gaseous atmosphere along the sensors to a thin film. The housing wall structure further is spaced along portions of the sensing conduit between the sensors and the input and output ports of the conduit to substantially limit the ambient gaseous atmosphere along such portions to a thin film. In one form, such wall structure, along these portions, converges from both directions along the conduit, to provide support regions for the conduit. The sensors, specifically, are self-heating coil elements formed of temperature-sensitive resistance wire wound around the outside of the sensing conduit. They are incorporated into a bridge-type circuit for sensing their temperatures.

15 Claims, 4 Drawing Sheets

FLUID MASS FLOW METER DEVICE WITH REDUCED ATTITUDE SENSITIVITY

This is a continuation of copending application(s) Ser. No. 07/283,050 filed on Dec. 6, 1988, which is a continuation of Ser. No. 07/150,463 filed Feb. 5, 1988, which is a continuation of Ser. No. 07/009,00 filed Jan. 30, 1987, which is a continuation of Ser. No. 06/834,150 filed Feb. 26, 1986, which is a continuation of Ser. No. 06/588,58 filed Mar. 12, 1984, all abandoned.

FIELD OF THE INVENTION

The invention pertains to the field of fluid flow sensing and, more particularly, to fluid mass flow sensing.

BACKGROUND AND SUMMARY OF THE INVENTION

Mass flow meters for gases measure the mass flow rate of a gas independently of gas temperature or pressure. Forms of such devices which operate on heat transfer principles have become widely adopted. A common commercial form incorporates a small diameter tube which has two coils of wire wound on the outside in close proximity to each other. The coils are formed from a metallic material having a resistance which is temperature-sensitive.

In a bridge-type electrical circuit, the coils can then be heated by an electrical current to provide equal resistances in the absence of flow of the gas and a balanced condition for the bridge-type circuit—e.g., a null output signal.

Then, with the gas flowing within the tube, within the relevant measuring range of the device, the temperature of the upstream coil is decreased by the cooling effect of the gas and the temperature of the downstream coil is increased by the heat from the upstream coil transmitted by the fluid. This difference in temperature is proportional to the number of molecules per unit time flowing through the tube. Therefore, based on the known variation of resistance of the coils with temperature, the output signal of the bridge circuit provides a measure of the gas mass flow.

In various circumstances, forms of heat transfer phenomena can introduce substantial error in the measurements of these mass flow meter devices. U.S Pat. No 3,938,384, issued Feb. 17, 1976, and U.S. Pat. No. 4,056,975, issued Nov. 8, 1977, both having the same Assignee as herein, are illustrative of the problem.

As discussed in the latter of these patents, at relatively elevated pressure levels of the gas, the error introduced by free convection of the gas within the tube becomes relatively dominant. The result, for such higher pressure levels, is a substantial error due to such convection when the device is tilted with respect to the direction of gravity. As discussed in both of these patents, at relatively lower pressures, the effects of this sort of convection are not substantial; however, the error introduced by free convection by the ambient gas outside the tube becomes a dominant source of error with variations in the attitude of the device with respect to gravity. In U.S. Pat. No. 3,938,384, the first-mentioned patent, this sort of convective effect is addressed by encapsulating the tube with the coils thereabout, in the vicinity of the coils, with an open cell foam material. Although, as indicated in the patent, the advantages of that approach are substantial, it does bring certain detriments. First, it slows the response of the device as a result of the presence of the foam material. Second, the calibration of the device can shift with time as the foam changes its chemical composition or its degree of contact with the coils and conduit. Third, it reduces the gain of the device.

A general approach to the convection outside the conduit, of which the just-mentioned approach may be considered a specific form, involves the use of various materials to contact the coils in order to keep convective currents from transferring heat externally from one coil to the other. This general approach typically is unsatisfactory for a variety of reasons, the most important one usually being the reduction of the level of response of the device to changes in flow.

Yet more generally, flow meter devices such as those discussed above, are commonly enclosed in some type of container to isolate their sensitive parts from outside air currents and outside localized sources of heating or cooling. This, of course, is a distinct concern from the effects of convection immediately adjacent to such sensitive parts.

Of some, related interest are some propositions that have been put forward with regard to heat transfer phenomena in gases. As far back as 1912, I. Langmuir, in "Convection and Conduction of Heat In Gases", *The Physical Review*, Vol. 34, No. 6, June 1912, pp. 401–422, proposed that there is a thickness for a layer of gas on a plane for which loss of heat from the plane through conduction strongly dominates over loss through convection, and that this thickness is a constant independent of the temperature of the plane (at least at a given temperature and pressure for the surrounding environment). For air, such thickness "B", at about room temperature and pressure, is proposed to be about 0.43 cm (about 0.17 inch). The analogous situation, then, is said to apply to a layer of the gas of outside diameter "b" about a wire of outside diameter "a", wherein, $b \ln(b/a) = 2B$.

The present invention addresses long-standing problems and concerns with attitude sensitivity in gas mass flow meters stemming from convective heat transfer outside a tube through which the gas is directed. It does so while also addressing the goals of high sensitivity and rapid responsiveness to changes in flow rate.

SUMMARY OF THE INVENTION

In accordance with the invention, there is provided a mass flow meter for measuring the flow rate of a fluid flowing in the interior of a sensing conduit having a pair of fluid flow ports, which includes: first and second sensors; apparatus for heating such sensors; apparatus for detecting a temperature differential between the sensors; and a housing. The first sensor is positioned along the flow path of the fluid externally of the sensing conduit closer to one of the fluid flow ports for the purpose of measuring its sensor temperature as modified by the fluid flow, and the second sensor is positioned along the flow path of the fluid externally of the sensing conduit closer to the other of the fluid flow ports for the purpose of measuring its sensor temperature as modified by the fluid flow. The housing has wall structure which is spaced along the sensors to substantially limit the ambient gaseous atmosphere along the sensors to a thin film. In accordance with more detailed features, the housing wall structure further is spaced along portions of the sensing conduit between the sensors and the ports to substantially limit the ambient gaseous atmosphere along such portions to a thin film. The wall structure along such a portion may converge from both directions along the sensing conduit to provide a support region for the conduit. In accordance with other more detailed features, the housing includes a body and a cover which mate to form the wall structure along the sensors.

The sensors may be self-heating coil elements formed of temperature-sensitive resistance wire wound around the outside of the sensing conduit; and the housing wall structure may substantially define cylindrical surface portions along the coils, e.g., having axes which are substantially perpendicular to the direction of coiling of the coils.

DETAILED DESCRIPTION

Figure 1:
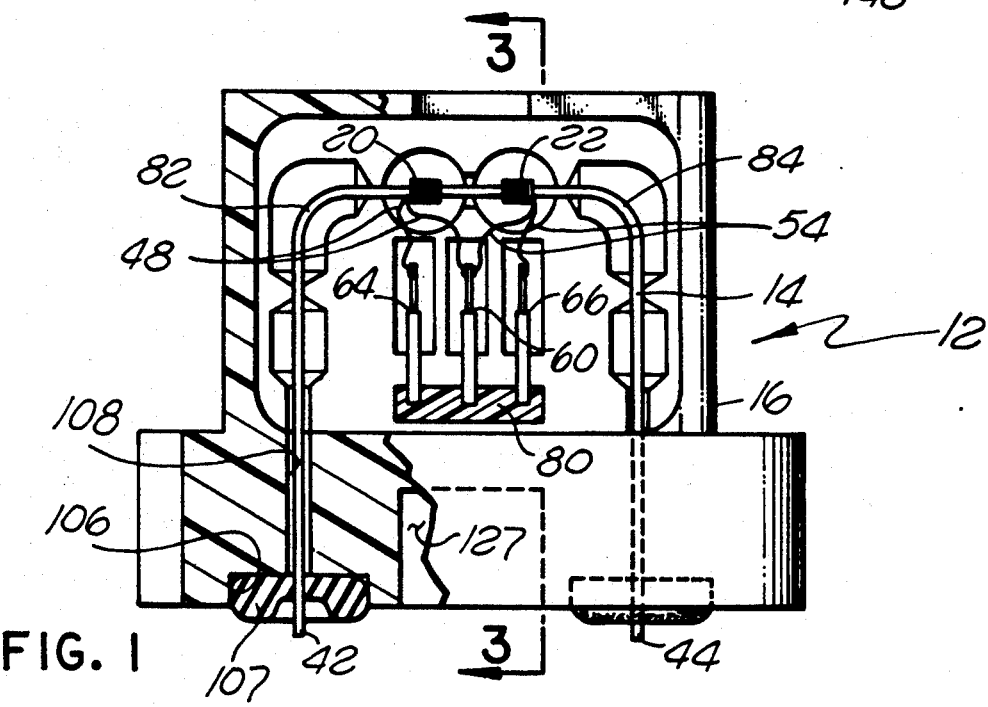
FIG. 1 is a front elevational view, partially in section, of a mass flow meter device with its cover removed.
Figure 3:
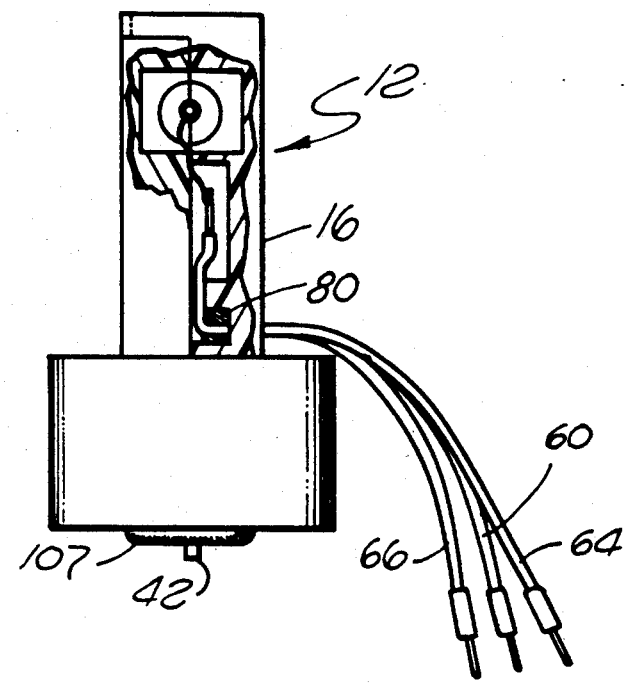
FIG. 3 is a side elevational view, partially in section, of the mass flow meter device of FIG. 1 with the cover in place, the section being taken along the line 3—3 of FIG. 1.
Figure 2:
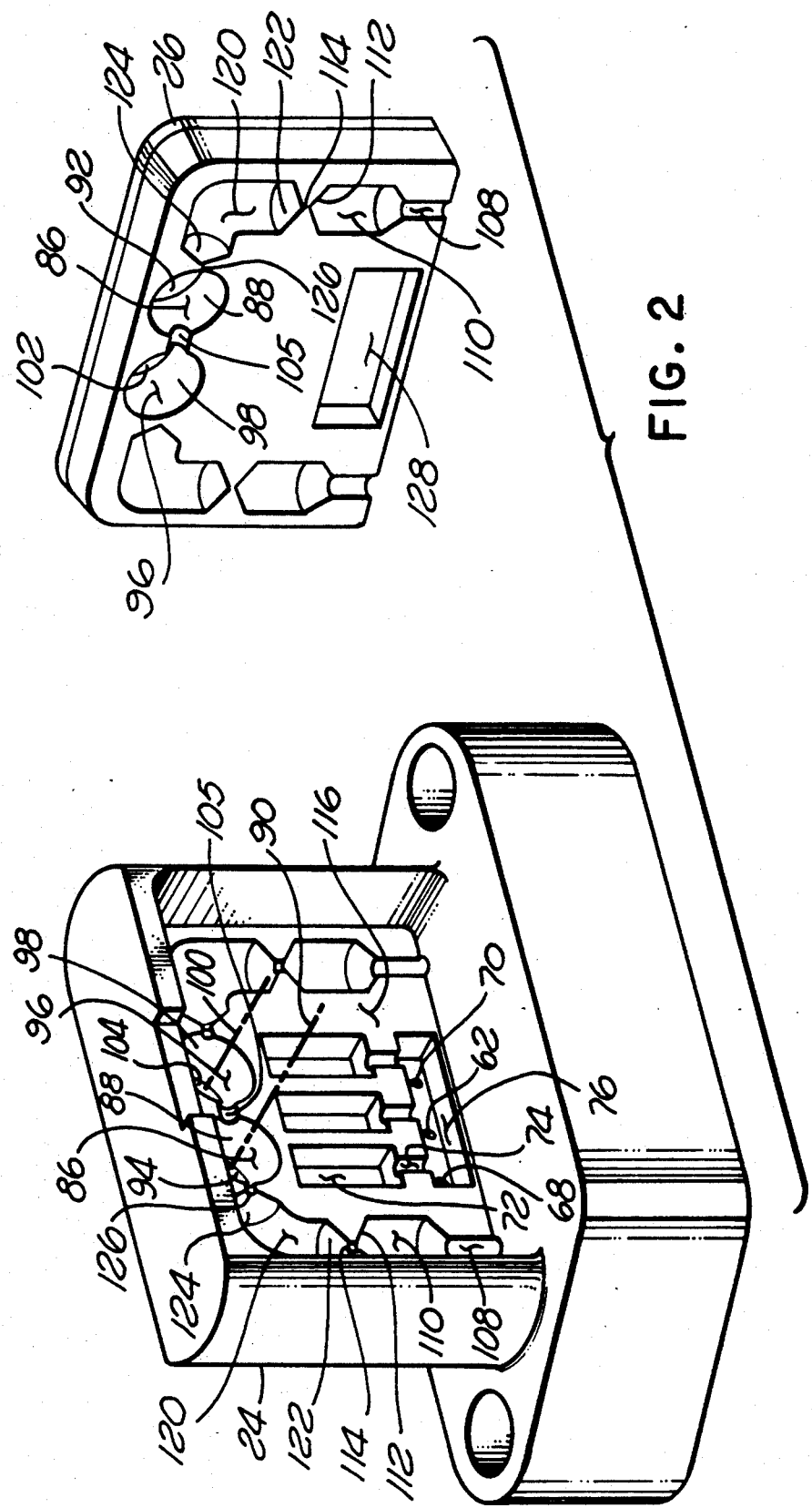
FIG. 2 is an enlarged perspective view showing the housing body and cover of the mass flow meter device of FIG. 1.

Referring to FIGS. 1-3, there are shown the details of a mass flow meter 12. By way of introduction, a sensing conduit 14, in a housing 16, has essentially identical upstream 20 and downstream 22 coils formed of temperature-sensitive resistance wire wound around the outside of the conduit. The housing has a body 24 and a cover 26 which press-fits into the body. As shown, the housing provides detailed and carefully designed cavities and wall structure with respect to various of the internal parts of the device.

Figure 4:
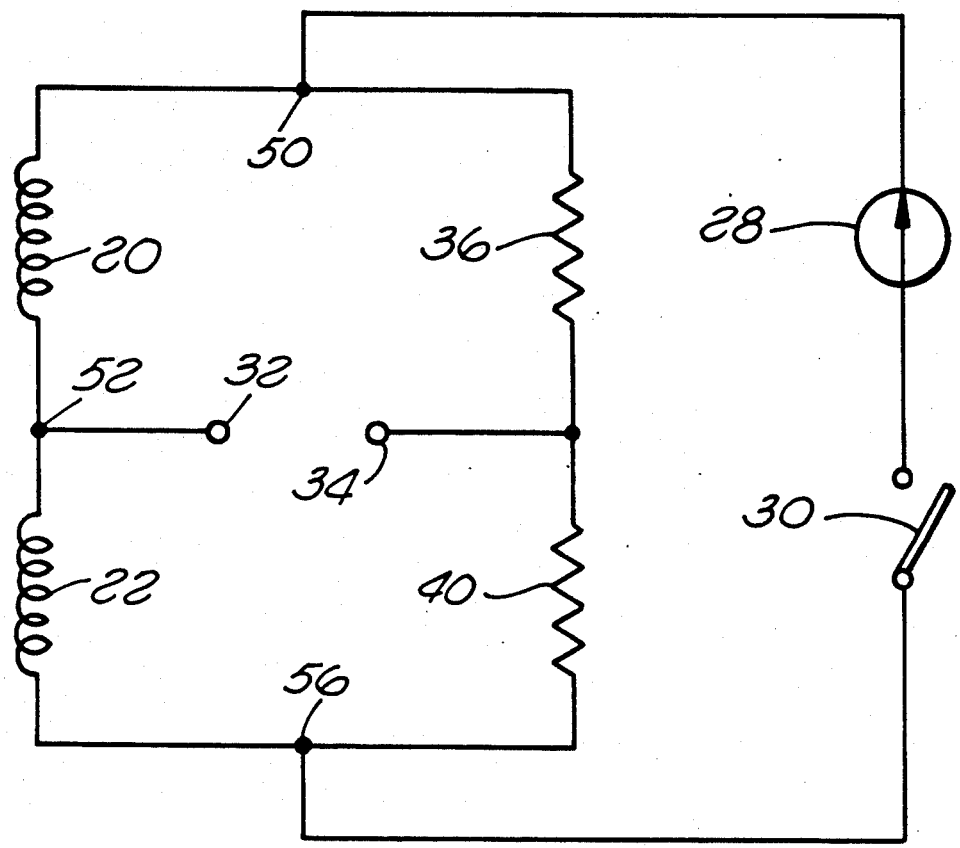
FIG. 4 is a schematic view showing coils of the mass flow meter device of FIG. 1 in a bridge-type circuit.

The device is adapted to operate with the coils 20 and 22 connected in a bridge-type electrical circuit. An example of such a circuit, with the coils 20 and 22 therein, is shown in FIG. 4. The operation of this and a variety of other bridge-type circuits is well known to and understood by those knowledgeable in the art. A dc current source 28, after a switch 30 is closed, with no gas flowing through the sensing conduit, establishes a base output voltage between two output terminals 32 and 34 of the circuit. The current through the coils 20 and 22 heats the wires of the coils to equal levels, establishing the same temperature in the two coils. With the two bridge resistors 36 and 40 having equal resistances, the base output voltage, then, of course, is zero and the bridge-type circuit is balanced.

With gas flow, however, the upstream sensor 20 is cooled by the gas flow, giving up some of its heat to the gas flowing by, and the downstream sensor 22 is heated, taking some of this heat that was given to the gas. Therefore, a temperature differential is established between the coils 20 and 22, resulting in a voltage across the output terminals 32 and 34. The voltage, of course, is due to the change in resistance of the coils with temperature.

The temperature difference between the coils, within the range of the device, is a measure of the number of gas molecules, and thus of the mass of the gas, flowing through the conduit. The difference in the resistance of the coils, similarly, is a measure of the difference in temperature between the coils. With the output voltage determined by this difference in resistance, the output voltage then becomes a measure of the mass flow rate of the gas.

To provide an output voltage which is proportional to the difference between the resistances of the coils, the two bridge resistors 36 and 40 should have much larger resistances than the resistances of the coils; Further, to make the bridge circuit accurate at a wide variety of temperatures, the current source 28 and the bridge resistors should incorporate temperature independence for the variety of temperatures.

As indicated, bridge-type circuits, including variations to implement independence of various environmental conditions, are well known and well understood. There, of course, is a concern here for coil material for the circuit having a resistance which is proportional to temperature and for coils, of this material, providing temperature differences which are proportional to mass flow rate. In this regard, typically, well outside the range of the mass flow rate meter device 12, the flow of the gas will become sufficiently fast to cool both the upstream 20 and the downstream 22 coils.

The sort of interaction between the gas and the coils of concern here is also well understood, as indicated by, e.g., the Assignee's prior U.S. Pat. Nos. 3,938,384, issued Feb. 17, 1976 and 4,056,975, issued Nov. 8, 1977.

Figure 5:
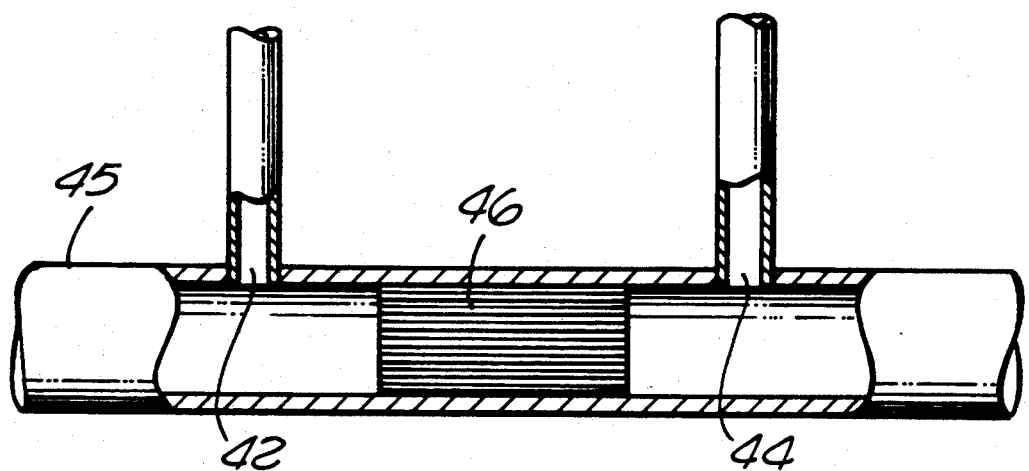
FIG. 5 illustrates the use of the mass flow meter device of FIG. 1 with a primary conduit.

By way of further introductory background, in FIG. 5, the input port 42 and output port 44 of the mass flow meter device 12 are shown in communication with a primary conduit 45 having a pressure drop device 46 somewhat schematically shown therein. With the primary conduit 45 inserted in a gas flow system (having one or more pressure drop devices for adjusting gas flow), the mass flow meter device 12 can be provided with changes in calibration—i.e., in a ratio between the mass flow rate through it and through the primary conduit and system. This sort of technique, also discussed in the aforementioned patents, is also well known and well understood. In accordance with well understood gas flow principles, the pressure drop device should be such that the pressure drop versus fluid flow characteristics in the primary conduit and in the sensing conduit 14 are comparable. In large part, this means choosing the pressure drop device such that laminar flow is maintained in both the primary conduit and the sensing conduit (as opposed to turbulent flow).

With this introduction and background, the aspects and details of the device 12 of FIGS. 1-3 which are of primary concern for present purposes, can be focused upon and understood in their context. Such details, to a substantial degree, concern the housing 16 and its relationship to the internal parts of the device 12. An alternative housing form, shown in FIG. 7, will be treated subsequently.

The housing 16 can be conveniently and advantageously made of metal, for example a zinc alloy such as that sold under the general designation Zamac. Another convenient and advantageous alternative is a polyamide material having relatively high thermal conductivity, for example a 50% glass or carbon fiber-filled polyamide. For convenience, in the drawings, the housing is shown as made of the polyamide material (see, e.g., FIGS. 2 and 3). The sensing conduit 14, disposed in the housing, should be made of a material which resists corrosion, such as corrosion resistant stainless steel.

The sensing conduit is advantageously coated with a polyurethane material to provide good electrical insulation before the coils 20 and 22 are wound around the conduit. Coils made of Balco coated with a thin layer of an electrically insulating enamel material known as Pyre-ml (these being designations of Amax Metals) are convenient and satisfactory. Each coil might typically include two layers, e.g., an inner layer wound from the outside in and an outer layer wound on top of the inner layer from the inside out, with the two leads for connection to a bridge-type circuit, as in FIG. 4, leading from the outside end of the coil.

In FIG. 1, and also referring to parts of FIG. 4, there is a pair of leads 48 from the upstream coil 20, one for the junction 50 with the bridge resistor 36 associated with that coil, and the other for the junction 52 between the two coils. Similarly, there is a pair of leads 54 from the downstream coil 22, one for the junction 56 with the bridge resistor 40 associated with that coil, and the other for the junction 52 between the coils. These leads are conveniently extensions of the coils, of the same materials as the coils.

The lead from each coil for the coil junction 52 is welded to the bare end of an otherwise insulated coil junction lead 60 which passes out of the housing 12 through an exit opening 62 for the lead (FIG. 2). Similarly, the other lead from the pair of leads 48 for the upstream coil is welded to the bare end of an otherwise insulated upstream coil-bridge resistor junction lead 64; and the other lead of the pair of leads 54 from the downstream coil is welded to the bare end of an otherwise insulated downstream coil-bridge resistor junction lead 66. There is also then an exit opening 68 for the upstream coil-bridge resistor junction lead and an exit opening 70 for the downstream coil-bridge resistor junction lead.

In the body 24 of the housing, there are three (like) lead cavities 72, one for each of the three aforementioned leads which exit the housing; three (like) passage cavities 74, one for the alignment of each such lead; and a single exit cavity 76 for the three leads, communicating directly with the exit openings for the three leads. As shown in FIGS. 1 and 3, an epoxy material 80 is placed in this exit cavity surrounding these leads. As is also indicated in these figures, the two pairs of coil leads 48 and 54 pass from cavities for the coils to the aforementioned lead cavities 72, between the body 24 and cover 26 of the housing. This does not present a problem because of the typical extremely small diameter of the wire for the coils. The diameter is so small that the presence of the leads between the body and cover has substantially no effect on the press-fit between the cover and the body.

Turning to the cavities and wall structure closely associated with the coils 20 and 22 and with the sensing conduit 14, first, the part of the conduit from the conduit's input port 42 to the upstream coil 20 essentially is an input side pre-coil portion 82 of the conduit. Similarly, the part of the conduit from the output port 44 of the conduit to the downstream coil 22 essentially is an output side post-coil portion 84 of the conduit. Referring to FIG. 2, the body 24 and cover 26 of the housing have wall structure which defines a number of cavities closely associated with the coils and the conduit, which can be identified.

There is a cylindrical form upstream coil cavity 86 which is largely defined by wall structure 88 taking substantially the form of a surface portion of a right circular cylinder having an axis 90 which is perpendicular to the direction of coiling of the upstream coil 20. The ends of the cavity are defined by flat, circular front 92 and back 94 (arbitrarily considering the cover of the housing, the front and the body, the back) surfaces. There is then an analogous, mirror-image cylindrical form downstream coil cavity 96, wall structure 98 largely defining the cavity, an axis 100 for such wall structure and front 102 and back 104 flat, circular surfaces defining the ends of the cavity. Between these coil cavities, there is a tubular, mid-coil cavity 105 for the passage of the conduit 14 between the coil cavities. This mid-coil cavity has a diameter which is larger than the conduit to avoid touching of the conduit by the wall structure for the cavity.

The cylindrical form wall structure 88 and 98 along the coils 20 and 22 is curved and oriented the way it is in part to facilitate the forming of the housing. Efficient formation is considered a significant concern and advantage when the small size of the various cavities is appreciated. Some exemplary dimensional information will be provided subsequently. However, as a general matter, it is important to appreciate that the wall structure of the housing along the coils provides spacing to substantially limit the ambient gas (e.g., air) along the coils to the dimensions of a thin film. It has been determined that such limitation will limit undesirable sensitivity of a device such as the meter device 12 to the device's attitude with respect to the direction of gravity due to convective heat transfer along the coils. Yet, if the wall structure is too close, the loss of heat by the coils to the wall structure undesirably decreases the sensitivity (output levels) of the device.

Now focusing on additional housing cavities and housing wall structure closely associated with the sensing conduit 14 on the input side of the device 12, such also serves to describe analogous, mirror-image cavities and wall structure on the output side. Thus, starting at the vicinity of the input port 42 of the sensing conduit 14, there is an essentially right, circular cylindrical seal cavity 106 (FIG. 1) for a generally O-ring type seal 107 which fits tightly about the conduit and fits tightly in the cavity. That cavity leads to an elongated essentially right, circular cylindrical input side transition cavity 108 (FIGS. 1 and 2) having an initial portion through the base of the housing body 24 and a final portion formed by wall structure of the housing body and housing cover 26. A small amount of a potting compound might be injected about the sensing conduit at the junction of the initial and final portions of the transition cavity, as a seal between the conduit and housing at that point.

The transition cavity leads to an input side intermediate cavity 110. There is initial wall structure for that cavity which expands the cavity to an intermediate portion of the cavity essentially having the shape of a right, circular cylinder. From that intermediate section, there is converging wall structure 112 which converges to an outer support region 114. This is a very short support region intended to minimize the contact between the housing and the conduit while at the same time providing support for the conduit.

For ease of construction, this support region along the cover is flat. Along the inside of the body of the housing, however, the support region essentially has the shape of a circle which is broken by a centered slot. The circle typically has a diameter which is approximately the diameter of the conduit with a center which would place the circumference of the circle slightly shy of the level of the base surface 116 inside the housing body 24. The slot typically has a width somewhat less than the diameter of the conduit. It breaks through between that base surface level and the interior of the circle. This shape is convenient for ease of construction and for gripping the conduit with a minimum of contact.

Leading from the outer support region 114, there is an input side corner cavity 120. Wall structure for this cavity also includes converging wall structure 122 which converges to that support region, just addressed. Thus, wall structure of the housing converges to the support region from both directions along the conduit. The corner cavity has relatively short, essentially right, circular cylindrical portions toward its inner (toward the coils) and outer (away from the coils) ends, away from the corner region. Further, at its inner end, there is converging wall structure 124 which converges to wall structure providing an inner support region 126 for the conduit.

This inner support region 126 is comparable to the outer support region 114 just described. Thus, there is a flat surface along the cover and a circular-shaped portion intersected by a slot along the body of the housing. The dimensional situation, with respect to the size of the conduit, is the same as that described for the outer support region. Thus, again, the design provides for efficiency of construction, good gripping of the conduit 14, and a minimum of contact between the conduit and the wall structure.

From the foregoing description of the cavities and wall structure along the input side pre-coil portion 82 of the conduit 14, it is apparent that, although the cavities are variously shaped for evident reasons, they are also designed with the particular goal of limiting the surrounding ambient gas to a thin film while supporting the conduit with relatively minimal housing-conduit contact.

As previously indicated, the immediately preceding description with regard to the cavities and sensing conduit at the input side of the gas flow meter device 12 also serves to describe the analogous mirror-image structure at the output side. An essentially right, circular cylindrical housing mid-base 127 and a rectangular-shaped mid-cover 128 cavity have not yet been noted. They are conventionally provided in the formation of the housing as a well known technique to prevent structural sag during formation. The mid-cover cavity overlaps the exit cavity 76, the passage cavities 74 and bottom portions of the lead cavities 72 of the housing body 24. In this respect, the mid-cover cavity also provides some additional clearance for the leads 60, 64, 66, and room for any excess epoxy material 80 that may overfill the exit cavity (see FIG. 3).

As indicated above, dimensional relationships for the housing and conduit of the FIG. 1–3 device are considered to be of some significance. One embodiment, according to this form and adapted for non-corrosive gases which should not tend to accumulate corrosion material which might affect the internal diameter of the conduit over time, has a sensing conduit with an outer diameter of about 14 mils (wall thickness of 2 mils).

Another such embodiment, particularly adapted for corrosive gases, has an outer diameter of about 30 mls (wall thickness of 2 mils). Coils of 125 mils in length are provided in each embodiment, the diameter of the coil wire being about 0.6 mils. Essentially the same housing structure is provided for both embodiments with variations only in the dimensions at the inner 126 and outer 114 support regions for the conduits. The maximum coil cavity wall separation along the coil in the cavity (employing the conduit-coil axis as the center line for measuring the separation) occurs at mid-coil between the junctions of the cavity end walls and cavity cylindrical-shaped side wall. That separation equals approximately 270 mils. The minimum such separation is at the edge of the coil in the cavity at the mid-plane of the cavity. This minimum is approximately 130 mls. Wall separation at the middle of the coil and mid-plane defines the cavity with a diameter of 180-mils. The height of the cavity (distance between the end walls) is 200-mils.

Some additional interesting computations can be made based on the foregoing dimensional information. First, for the small conduit having a 14-mil diameter, with a two-layer coil of 0.6-mil diameter coil wire, the conduit with the coil thereon might be viewed as having an outer diameter of about 16 mils. Similarly, for the large conduit having an outer diameter of 30 mls, such conduit with such coil thereon might be thought of as having an outer diameter of about 32 mils. Such outer diameters might then be designated with the letter "a". Then the coil cavity wall separation (again employing the conduit-coil axis as the center line for such separation) might be designated as "b". Further, the places of maximum and minimum wall separation along the coil are as noted immediately above; and they are also the places of maximum wall-coil spacing along the coil. With this background and with the term "spacing" below referring to such wall-coil spacing, the following calculations can be made:

| Small conduit: | maximum (b/a) = | 16.8; |
| --- | --- | --- |
| | minimum (b/a) = | 8.13 |
| | maximum spacing = | 127 mils; |
| | minimum spacing = | 57 mils; |
| | maximum bln (b/a) = | 0.76; |
| | minimum bln (b/a) = | 0.27. |
| Large conduit: | maximum (b/a) = | 8.41; |
| | minimum (b/a) = | 4.06; |
| | maximum spacing = | 119 mils; |
| | minimum spacing = | 49 mils; |
| | maximum bln (b/a) = | 0.57; |
| | minimum bln (b/a) = | 0.18. |

Then considering the small and large conduits together and rounding up for maxima and down for minima, from the above calculations, the following approximately applies:

| Small and large conduits: | |
| --- | --- |
| maximum (b/a) = | 17.0; |
| minimum (b/a) = | 4.0; |
| maximum spacing = | 130 mils; |
| minimum spacing = | 45 miles; |
| maximum bln (b/a) = | 0.80; |
| minimum bln (b/a) = | 0.15. |

It is also of some interest to make certain computations at mid-coil along the mid-plane of the coil cavity (where the 180-mil wall separation along the coil applies):

| | |
|---|---|
| Small conduit: | b/a = 11.3; |
| | spacing = 82 mils; |
| | bln (b/a) = 0.44. |
| Large conduit: | b/a = 5.63; |
| | spacing = 74 mils; |
| | bln (b/a) = 0.31. |

Test data on models intended to somewhat generally simulate the operation of the meter device of FIGS. 1-3, employing the glass fiber-filled polyamide housing material, but with certain variant coil cavity sizes, reveals excellent, low sensitivity to attitude with respect to the direction of gravity, excellent, fast responsiveness to changes in flow rate and fully adequate sensitivity. The coil cavities were oriented with their cylindrical axes parallel to rather than perpendicular to the direction of coiling of the coils. In this regard, their ends were sufficiently spaced from the coil ends to essentially remove any significant effects from coil-housing interaction in these regions. The simulations, except in one case noted below, did not include support for the sensing conduit between the coils (it is noted that such support is also not employed in the device that has been described). With respect to sensitivity measurements, the bridge-type circuit was of a type for which a maximum output (amplified) of about 5 volts is viewed as indicative of very good sensitivity and in the range of 7.5 volts as indicative of essentially the greatest sensitivity attainable. The responsiveness to changes in flow rate was measured by starting at a set flow rate, increasing the flow rate in essentially a step function, and then decreasing the flow rate back down to the initial rate in essentially a step function. The time "$t_1$" was then the time after the initial increase for the output to reach about ninety percent of its maximum level; the time "$t_2$" was the time after the initial increase for the output to reach about ninety-eight percent of its maximum value; the time "$t_3$" was the time after the decrease for the output to fall to about ten percent of its maximum value; and the time "$t_4$" was the time after the decrease for the output to fall to about two percent of its maximum value. With this background, with the coil cavity diameters as indicated below, with the qualification (as indicated above and also in the chart below) that a center support was added for one set of data, and with the attitude coefficient (below) taken to be the maximum of the the +90° and −90° sensitivity divided by the full scale output and by 90° and then stated as a percentage by multiplying by 100, the data for five "runs" covering two different diameters was as follows:

| Coil Cavity Diameters | 1 (62 mils) | 2 (125 mils) | 1A (62 mils) | 2A (125 mils) | 2B[1] (125 mils) |
|---|---|---|---|---|---|
| Full scale output (volts) | 3.69 | 5.00 | 3.69 | 4.76 | 4.23 |
| Attitude +90° Sensitivity (volts) −90° | +0.00 −0.00 | +0.05 −0.05 | +0.00 −0.00 | +0.06 −0.06 | +0.03 −0.03 |
| Coefficient ± %/degree | 0.000 | 0.011 | 0.000 | 0.014 | 0.008 |
| Response Data: (sec.) | | | | | |
| $t_1$ | 3 | 3 | 3 | 3 | 4 |
| $t_2$ | 11 | 6 | 11 | 6 | 10 |
| $t_3$ | 4 | 4 | 4 | 4 | 4.5 |
| $t_4$ | 16 | 10 | 16 | 10 | 11 |
| Measured Coil Resistance (ohms) | | | | | |
| Upstream | 290 | 290 | 286 | 294 | — |
| Downsteam | 288 | 288 | 287 | 294 | — |

[1] Center support added.

Prior to the foregoing test data, comparable test data for varying diameters (again, with coil cavities in the parallel orientation) with the same polyamide housing material and for a rigid urethane housing material was compiled. At the same time, test data for a standard commercial device of the Assignee (known as Assignee's No. 900011-001) with coils encased in open cell foam material, in accordance with the teachings of U.S. Pat. No. 3,938,384, referred to in the Background and Summary of the Invention, was taken ("Standard" below). Along with this, Assignee's standard commercial device (known as Assignee's No. 900011-006) that is the same as the former one, but with the foam material removed, was also tested ("Standard Uninsulated" below). This earlier testing was done as a rather preliminary, rough test, but is of some interest. In this regard, the simulation of the sealing of the space between the housing and conduit at two points with potting material, referred to earlier, was not included except in the runs designated 1A and 2A. This was done then because of instability of readings thought to be due to looseness of the parts in the housing. However, accurate centering of the coils was not accomplished in connection with such sealing and runs. With this background, this earlier test data is as follows:

| Coil Cavity Diameters | 1 (62 mils) Polyamide | 2 (125 mils) Polyamide | 3 (125 mils) Rigid Urethane | 4 Standard | 5 Standard Uninsulated | 1A (62 mils) Polyamide | 2A (125 mils) Polyamide |
|---|---|---|---|---|---|---|---|
| Full Scale Output (volts) | 3.10[1] | 4.27 | 6.07 | 5.38 | 5.41 | 2.69 | 3.31 |
| Attitude +90° | −0.30 | +0.03 | +0.2[2] | 0.00 | 1.47 | 0.00 | 0.02 |

-continued

| Coil Cavity Diameters | 1 (62 mils) Polyamide | 2 (125 mils) Polyamide | 3 (125 mils) Rigid Urethane | 4 Standard | 5 Standard Uninsulated | 1A (62 mils) Polyamide | 2A (125 mils) Polyamide |
|---|---|---|---|---|---|---|---|
| Sensitivity −90° Coefficient ± %/degree | −0.34 0.12 | −0.03 0.008 | −0.2[2] 0.037 | −0.01 0.002 | −.70[3] 0.30 | −0.02 0.008 | −0.02 0.007 |
| Response Data: (sec) | | | | | | | |
| $t_1$ | 3.0 | 3.0 | 6.0 | 6.0 | 5.0 | 4.0 | 4.0 |
| $t_2$ | 9.0 | 7.0 | 30.0 | 12.5 | 8.0 | 14.0 | 14.0 |
| $t_3$ | 4.0 | 3.0 | 10.0 | 9.0 | 5.5 | 4.5 | 4.0 |
| $t_4$ | 13.0 | 11.0 | 45.0 | 19.0 | 11.0 | 16.0 | 15.0 |
| Measured Coil Resistance (ohms) | | | | | | | |
| Upstream | 289 | 284 | 288 | 306 | 310 | 280 | 290 |
| Downstream | 285 | 284 | 290 | 306 | 311 | 281 | 290 |

[1]Zero level unstable.
[2]Zero level unstable.
[3]Signal saturated.

It, first of all, is to be noted that some of the indicated and readily evident difficulties with this test data were overcome with regard to the test data previously presented. However, this data is significant in indicating fast response times for a material such as the polyamide material by comparison with a material such as rigid urethane. It is also significant in indicating the attainability of good attitude insensitivity without the disadvantages attendant to the use of the open cell foam material encapsulating the coils (and conduit in the vicinity of the coils).

By way of some additional test data, averages for various forms intended to generally simulate cylindrical coil cavities, was illustrative of the general decrease in attitude insensitivity with cavity size (with, however, the general increase in full-scale output with cavity size). This averaged data for the full-scale output and attitude sensitivity coefficient versus cavity diameter was as follows: 62 mils-3.2 volts and 0.005%/per degree; 125 mils-4.2 volts and 0.015%/per degree; 180 mils-5 volts and 0.03%/per degree. The first two involved coil cavities in the parallel orientation, and the third, coil cavities in the perpendicular orientation.

Figure 7:
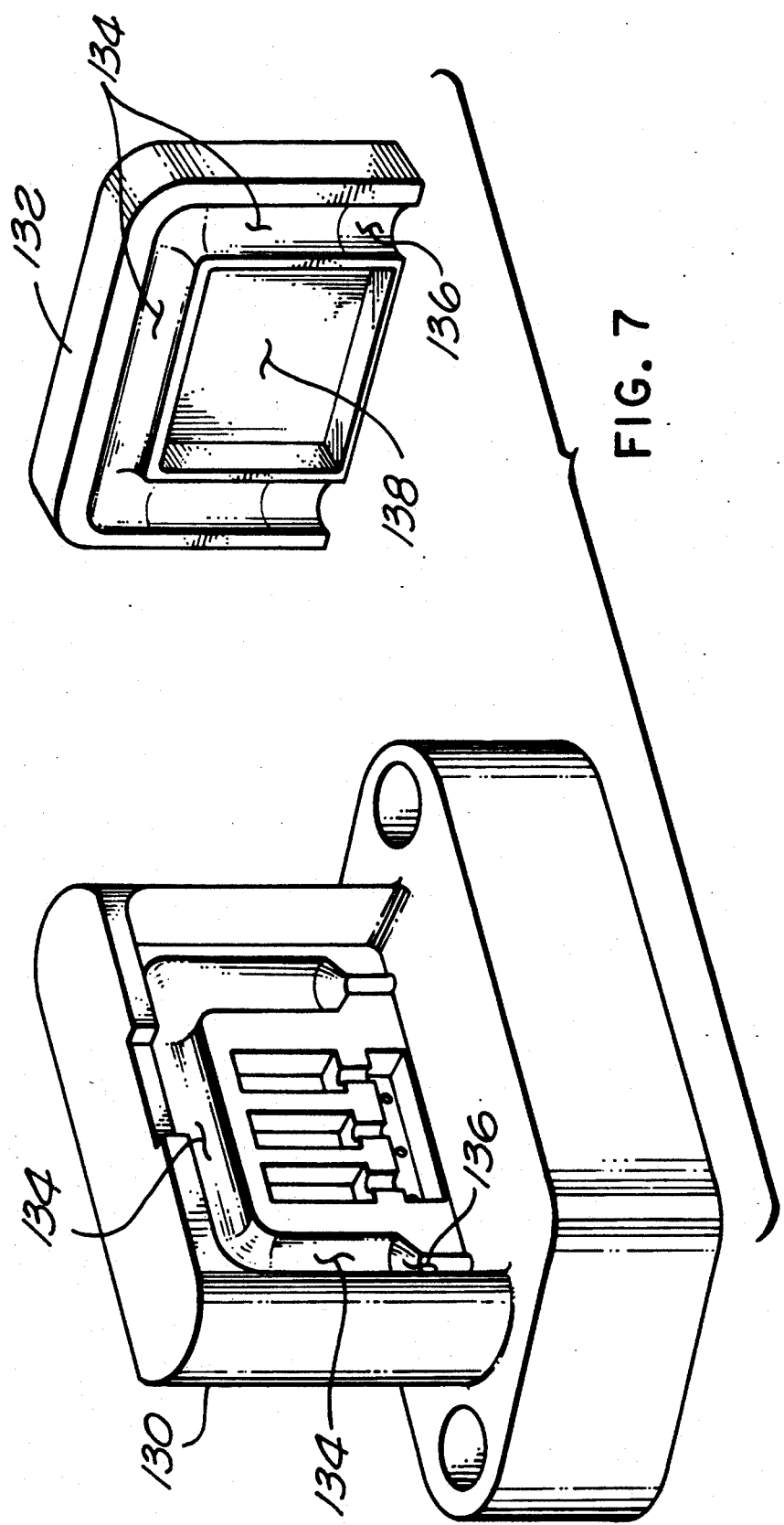
FIG. 7 is an enlarged perspective view showing an alternative housing body and cover for the mass flow meter device of FIG. 1.

FIG. 7 shows an alternative housing form for the flow meter device of FIGS. 1-3. In this respect, apart from the form of the housing, the parts of the device and the manner of connection and use of the device are essentially identical to the parts and manner of connection and use as described in connection with FIGS. 1-5. Moreover, the description with respect to the housing of FIGS. 1-3 applies in essentially identical fashion to the housing of FIG. 7 with the exceptions which will be particularly focused upon.

First, by way of background, the test data which has been discussed, along with other related test data, has revealed that the housing form of FIG. 7, for many potential applications, provides both test results, including satisfactory amplitude and attitude insensitivity, and physical stability of structure, which are within the requirements of such applications. This is of particular significance in that the added simplicity of construction is advantageous.

Referring only to the areas for which the housing description in connection with FIGS. 1-3 does not apply, again the input and ouput sides of the housing body 130 and housing cover 132, with regard to their internal wall structure and the cavities such structure provides, are mirror images of one another so that a description as to the input side in effect also describes the output side.

Thus, referring to the input side, there is a relatively long input side main cavity 134 having a corner, which replaces a number of cavities in the housing of FIGS. 1-3, including the cylindrical form upstream coil cavity 86. This input side cavity 134 has essentially right, circular cylindrical portions for its inner (toward the coil) and outer (away from the coil) portions, away from its corner portion.

Leading into the input side main cavity 134, there is an input side lead-in cavity 136. As to the portion of such cavity defined by the housing body 130 wall structure, it is essentially identical to the equivalent portion in the housing of FIGS. 1-3. As to the portion defined by the housing cover 132, it has essentially a half right circular cylindrical shape, with the same diameter as the main cavity 132. Ease of construction, of course, is a consideration in the "non-mating" construction of such housing body-defined and housing cover-defined portions of this lead-in cavity.

The cover 132, in the housing form of FIG. 7, also has a generally rectangular-shaped mid-cover cavity 138 which is significantly larger in area than the mid-cover cavity 128 of FIGS. 1-3. Thus, in this case, the mid-cover cavity is large enough to more than overlap the housing body cavities with which it communicates.

For the small 14-mil diameter conduit and the large 30-mil diameter conduit, calculations involving "a", "b" and the wall-coil "spacing", as defined earlier, can be made. In this case, however, because of the cavity shape adopted, the calculations involve constants rather than maxima and minima. In particular, for a 120-mil diameter main input side cavity 134 (and, of course, the same diameter for its output side mirror image), which dimension applies with respect to the form of FIG. 7, the following then approximately applies:

| Small conduit: | (b/a) = 7.5; |
| | spacing = 52 mils |
| | bln (b/a) = 0.24. |
| Large conduit: | (b/a) = 3.75; |
| | spacing = 44 mils; |
| | bln (b/a) = 0.16. |

Then considering the small and large conduits together and rounding up for maxima and down for minima, from the above calculations, the following also applies:

| Small and large conduits: | |
|---|---|
| maximum (b/a) = | 8.0; |
| minimum (b/a) = | 3.7; |
| maximum spacing = | 55 mils; |
| minimum spacing = | 40 mils; |
| maximum bln (b/a) = | 0.25; |
| minimum bln (b/a) = | 0.15. |

Figure 6:
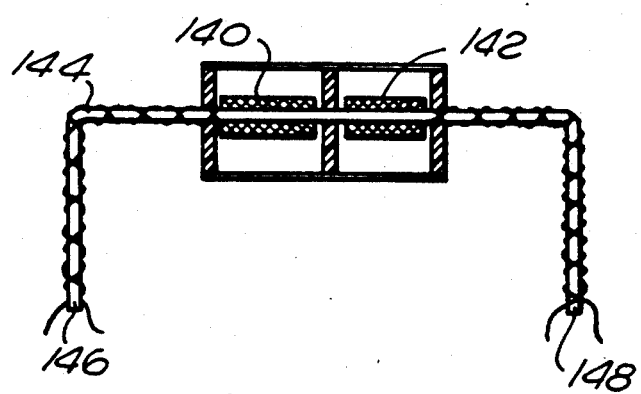
FIG. 6 is a cross-sectional view of an alternative embodiment serving as a test mass flow meter device.

In FIG. 6, a rough, initial test device as to concept, is shown. This device was initially tested for adequacy of speed of response against a standard commercial device of the Assignee's of the type, referred to above, employing open cell foam encasing material for the coils of the device. Referring to FIG. 6, there is an upstream coil 140 and a downstream coil 142. There is a sensing conduit 144 having an input port 146 and an output port 148. Three Mylar (a polyethylene teraphthalate material) discs are on the conduit at the center and ends of a cavity which is enclosed by wrapping Scotch Tape (a cellophane material tape) about the discs. The conduit is of the smaller outer diameter (14 mil) type referred to earlier. The coils are also of the type referred to earlier. Two coil leads from each coil, for connection to a bridge-type circuit, are also shown. The diameter of the coil cavities was 180 mils, the total length of the wrapping tape for the cavities was about 300 mils. For the standard commercial device of the Assignee's, of the type using open cell foam encasing material for the coils, a given flow rate was defined as an "open" valve position and a "shut" valve position was defined as a flow rate of ten percent of this value. With the given rate then considered the one hundred percent level (and the "shut" valve level the ten percent level), the times for the output signal for the standard device (in a given bridge-type circuit) to fall to the thirty-seven percent and fifteen percent levels respectively, upon going from an open to shut condition, were 1.7 seconds and 8.8 seconds, respectively. The comparable times for the device of FIG. 6 were 0.8 seconds and 4.0 seconds, respectively. This, of course, was a very favorable result. Going from the shut to open condition, for the standard device, the times to rise to the sixty-three percent and ninety percent levels, respectively, were 0.2 seconds and 5.6 seconds. The comparable times for the device of FIG. 6 were 0.2 seconds and 2.3 seconds, respectively. Again, this was a favorable comparison.

The generally desirable properties for the housing material are low mass, low specific heat and high thermal conductivity—which of course are not harmonious goals. The test data outlined above is viewed as indicating that a variety of specific housing materials should be satisfactory but that the choice can be of substantial significance. Thus the rigid urethane material is generally unacceptable due to its low thermal conductivity.

Finally, two points might be noted. First, there is a trade-off evident from the foregoing with respect to efficiency of production relating to difficulties associated with very small cavity sizes, and attitude insensitivity. Second, the goal of relative insensitivity to attitude, of course, is recognized as important to provide flexibility in the mounting and orienting of a mass flow meter device. In addition, it enables the use of such a device on a moving platform in that the forces of acceleration are analogous to gravitational forces.

It, of course, will be apparent to those skilled in the art that many modifications and variations may be made in the embodiments which have been described without departing from the scope or spirit of the invention. By way of example, the principles applicable to the specific embodiments also apply equally well to forms of mass flow meters which employ upstream and downstream sensor coils which are heated by a heater coil about the conduit, therebetween. In such case, rather than, for example, the housing of FIGS. 1-3, one might employ a housing defining three coil cavities, separately limiting the ambient gaseous atmosphere along each of the three coils to a thin film. By way of further example, such principles also apply to forms of mass flow meters having thermocouples as upstream and downstream sensors to measure temperature differences along a conduit which is internally heated by electrical current. These other forms, as indicated, are merely exemplary. Accordingly, the scope hereof shall not be referenced to the disclosed embodiments, but on the contrary, shall be determined in accordance with the claims as set forth below.

What is claimed is:

1. A mass flow meter for measuring the flow rate of a fluid flowing in the interior of a sensing conduit having a pair of fluid flow ports, comprising:
   a first self-heating coil element positioned along the flow path of the fluid externally of the sensing conduit closer to one of the fluid flow ports and a second self-heating coil element positioned along the flow path of the fluid externally of the sensing conduit closer to the other of the fluid flow ports, said coil elements being formed of temperature-sensitive resistance wire wound around the outside of the sensing conduit for sensing the temperatures of said coil elements modified by the fluid flow;
   means for heating said coil elements;
   means for detecting a temperature differential between said coil elements; and
   a housing having wall structure spaced along said coil elements to substantially define the thickness of an ambient gaseous atmosphere along said coil elements, the maximum spacing between said wall structure, along said coil elements, being less than or equal to about 270 mils, said wall structure being formed of a metallic material, or of a polyamide material having a heat conductivity much larger than air.

2. A mass flow meter as defined in claim 1 wherein said housing wall structure, along a portion of said conduit between a said coil element and a said port, converges from both directions along the conduit to provide a support region for the conduit.

3. A mass flow meter as defined in claim 1 wherein said housing wall structure is curved along said coils.

4. A mass flow meter as defined in claim 1 wherein said housing wall structure substantially defines cylindrical surface portions along said coils.

5. A mass flow meter as defined in claim 4 wherein the axes of said cylindrical surface portions are substantially perpendicular to the direction of coiling of said coils.

6. A mass flow meter as defined in claim 1 wherein said housing comprises a body and a cover which mate to form said wall structure along said coils.

7. A mass flow meter for measuring the flow rate of a fluid flowing in the interior of a sensing conduit having a pair of fluid flow ports, comprising:

a first sensor means positioned along the flow path of the fluid externally of the sensing conduit closer to one of the fluid flow ports for measuring the temperature of said first sensor means as modified by the fluid flow and a second sensor means positioned along the flow path of the fluid externally of the sensing conduit closer to the other of the fluid flow ports for measuring the temperature of said second sensor means as modified by the fluid flow;

means for heating said first and second sensor means;

means for detecting a temperature differential between said first and second sensor means; and a housing having wall structure spaced along said first and second sensor means to substantially define the thickness of an ambient gaseous atmosphere along said first and second sensor means, the maximum spacing between said wall structure, along said first and second sensor means, being less than or equal to about 270 mils, said wall structure being formed of a metallic material, or of a polyamide material having a heat conductivity much larger than air.

8. A mass flow meter as defined in claim 7 wherein said housing wall structure, along a portion of said conduit between a said sensor means and a said port, converges from both directions along the conduit to provide a support region for the conduit.

9. A mass flow meter as defined in claim 7 wherein said housing comprises a body and a cover which mate to form said wall structure along said sensor means.

10. A mass flow meter for measuring the flow rate of a fluid flowing in the interior of a sensing conduit having a pair of fluid flow ports, comprising:

a first self-heating coil element positioned along the flow path of the fluid externally of the sensing conduit closer to one of the fluid flow ports and a second self-heating coil element positioned along the flow path of the fluid externally of the sensing conduit closer to the other of the fluid flow ports, said coil elements being formed of temperature-sensitive resistance wire wound around the outside of the sensing conduit for sensing the temperatures of said coil elements modified by the fluid flow;

means for heating said coil elements;

means for detecting a temperature differential between said coil elements; and a housing having wall structure spaced along said coil elements to substantially define the thickness of an ambient gaseous atmosphere along said coil elements, the maximum spacing between said wall structure, along said coil elements, being less than or equal to about 270 mils, said wall structure being formed of material and structure providing a heat conductivity therethrough much greater than air.

11. A mass flow meter for measuring the flow rate of a fluid flowing in the interior of a sensing conduit having a pair of fluid flow ports, comprising:

a first sensor means positioned along the flow path of the fluid externally of the sensing conduit closer to one of the fluid flow ports for measuring the temperature of said first sensor means as modified by the fluid flow and a second sensor means positioned along the flow path of the fluid externally of the sensing conduit closer to the other of the fluid flow ports for measuring the temperature of said second sensor means as modified by the fluid flow;

means for heating said first and second sensor means;

means for detecting a temperature differential between said first and second sensor means; and a housing having wall structure spaced along said first and second sensor means to substantially define the thickness of an ambient gaseous atmosphere along said first and second sensor means, the maximum spacing between said wall structure, along said first and second sensor means, being less than or equal to about 270 mils, said wall structure being formed of material and structure providing a heat conductivity therethrough much greater than air.

12. A thermal mass flow meter, comprising a sensor pipe to carry a fluid flow to be measured therethrough, a heating and temperature-sensing means mounted on said sensor pipe, a case formed of a polyamide material having a heat conductivity much larger than air or of a metallic material and having an opening therethrough, and means for supporting said sensor pipe in said opening in spaced relationship with said case, said opening being defined by case wall structure having a maximum spacing along said heating and temperature-sensing means of not larger than about 6.858 mm (270 mils).

13. A thermal mass flow meter as set forth in claim 12, wherein said heating and temperature-sensing means consists of a pair of windings which are connected both to a power source and to a voltage-detecting circuit for heating and detecting the temperature.

14. A thermal mass flow meter, comprising a sensor pipe to carry a fluid flow to be measured therethrough, a heating and temperature-sensing means mounted on said sensor pipe, a case whose heat conductivity is much larger than that of air having an opening therethrough, and means for supporting said sensor pipe in said opening in spaced relationship with said case, said opening being defined by case wall structure having a maximum spacing along said heating and temperature-sensing means of not larger than about 6.858 mm (270 mils).

15. A thermal mass flow meter as set forth in claim 14, wherein said heating and temperature-sensing means consists of a pair of windings which are connected both to a power source and to a voltage-detecting circuit for heating and detecting the temperature.

* * * * *

UNITED STATES PATENT AND TRADEMARK OFFICE
CERTIFICATE OF CORRECTION

PATENT NO. : 5,191,793
DATED : March 9, 1993
INVENTOR(S) : Drexel et al.

It is certified that error appears in the above-identified patent and that said Letters Patent is hereby corrected as shown below:

Col. 1, line 8, delete "07/009,00" and insert --07/009,008--.

Col. 1, line 11, delete "06/588,58" and insert --06/588,586--.

Col. 1, line 46, delete "U.S" and insert --U.S.--; and delete "No" and insert --No.--.

Col. 4, line 15, delete "coils;" and insert --coils.--.

Signed and Sealed this

Fourth Day of October, 1994

Attest:

BRUCE LEHMAN

Attesting Officer     Commissioner of Patents and Trademarks